UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

LIQUID FUEL.

1,271,115.  Specification of Letters Patent. Patented July 2, 1918.

No Drawing.  Application filed October 12, 1917. Serial No. 196,180.

*To all whom it may concern:*

Be it known that I, ARTHUR A. BACKHAUS, of Baltimore, in the State of Maryland, have invented a certain new and useful Improvement in Liquid Fuel, and do hereby declare that the following is a full, clear, and exact description thereof.

My invention relates particularly to fuels designed to be used in any desired manner, but it has application especially to fuels adapted to be used as a source of power, as for example fuels for burners and motor fuels.

The object of my invention is to provide a fuel containing a petroleum hydrocarbon, as well as alcohol, and an ingredient adapted to blend the same or form a solution with the hydrocarbon and alcohol.

A further object of my invention is to provide a fuel of this character, which is of such a nature that only a very small quantity of the third ingredient is found necessary.

A further object is to provide a fuel of this character which contains a large percentage of the petroleum hydrocarbon, notwithstanding the small percentage of the third ingredient.

A further object is to provide a fuel of this character in which the third ingredient is a phenol.

Another object is to provide such a fuel in which the third ingredient is cresol.

Further objects of my invention will appear from the detailed description thereof contained hereinafter.

While my invention is capable of being carried out in different ways, for the purpose of illustration I shall describe only certain ways of carrying out the same herein.

For example, a fuel made in accordance with my invention may be comprised of:—
25 parts by volume of ethyl alcohol,
25 parts by volume of gasolene,
25 parts by volume of kerosene, and
8 parts by volume of cresol.

Fuels made in accordance with my invention may contain, also, additional blending agents, if desired.

As another example of my invention, the fuel may, accordingly, be comprised of:—
25 parts by volume of ethyl alcohol,
25 parts by volume of kerosene,
25 parts by volume of gasolene,
4 parts by volume of acetone, and
5 parts by volume of cresol.

Again, a fuel made in accordance with my invention may be comprised of:—
25 parts by volume of kerosene,
25 parts by volume of gasolene,
25 parts by volume of ethyl alcohol,
4 parts by volume of cresol, and
4 parts by volume of benzol.

As another example of my invention, the fuel may be comprised of:—
25 parts by volume of alcohol,
25 parts by volume of kerosene,
25 parts by volume of gasolene,
15 parts by volume of toluene,
15 parts by volume of benzol, and
15 parts by volume of cresol.

As still another example of my invention, the fuel may be comprised of the following:—
25 parts by volume of kerosene,
25 parts by volume of gasolene,
25 parts by volume of ethyl alcohol,
17 parts by volume of methyl alcohol,
17 parts by volume of benzol,
17 parts by volume of nitrobenzol,
17 parts by volume of cresol,
17 parts by volume of toluene.

It is to be understood, also, that, instead of the phenols above referred to, I may use carbolic acid or other phenols.

It will be understood, also, that, instead of using gasolene and kerosene, I may use merely gasolene in the above examples of my invention.

While I have described my invention above in detail, I wish it to be understood that many changes may be made therein without departing from the spirit thereof.

I claim:

1. A fuel comprising a petroleum distillate, an alcohol and a phenol adapted to blend the other constituents.

2. A fuel comprising a petroleum distillate, an alcohol and cresol adapted to blend the other constituents.

3. A fuel comprising gasolene, an alcohol and a phenol adapted to blend the other constituents.

4. A fuel comprising gasolene, an alcohol and cresol adapted to blend the other constituents.

5. A fuel comprising gasolene, kerosene, an alcohol and a phenol adapted to blend the other constituents.

6. A fuel comprising gasolene, kerosene, an alcohol and cresol adapted to blend the other constituents.

7. A fuel comprising a petroleum distillate, ethyl alcohol and a phenol adapted to blend the other constituents.

8. A fuel comprising a petroleum distillate, ethyl alcohol and cresol adapted to blend the other constituents.

9. A fuel comprising gasolene, ethyl alcohol and a phenol adapted to blend the other constituents.

10. A fuel comprising gasolene, ethyl alcohol and cresol adapted to blend the other constituents.

11. A fuel comprising gasolene, kerosene, ethyl alcohol and a phenol adapted to blend the other constituents.

12. A fuel comprising gasolene, kerosene, ethyl alcohol and cresol adapted to blend the other constituents.

In testimony that I claim the foregoing I have hereunto set my hand.

ARTHUR A. BACKHAUS.